Feb. 23, 1937. C. B. VON GIRSEWALD ET AL 2,071,598
METHOD OF PRODUCING FUMING SULPHURIC ACID HAVING A HIGH CONCENTRATION
Filed Dec. 24, 1935
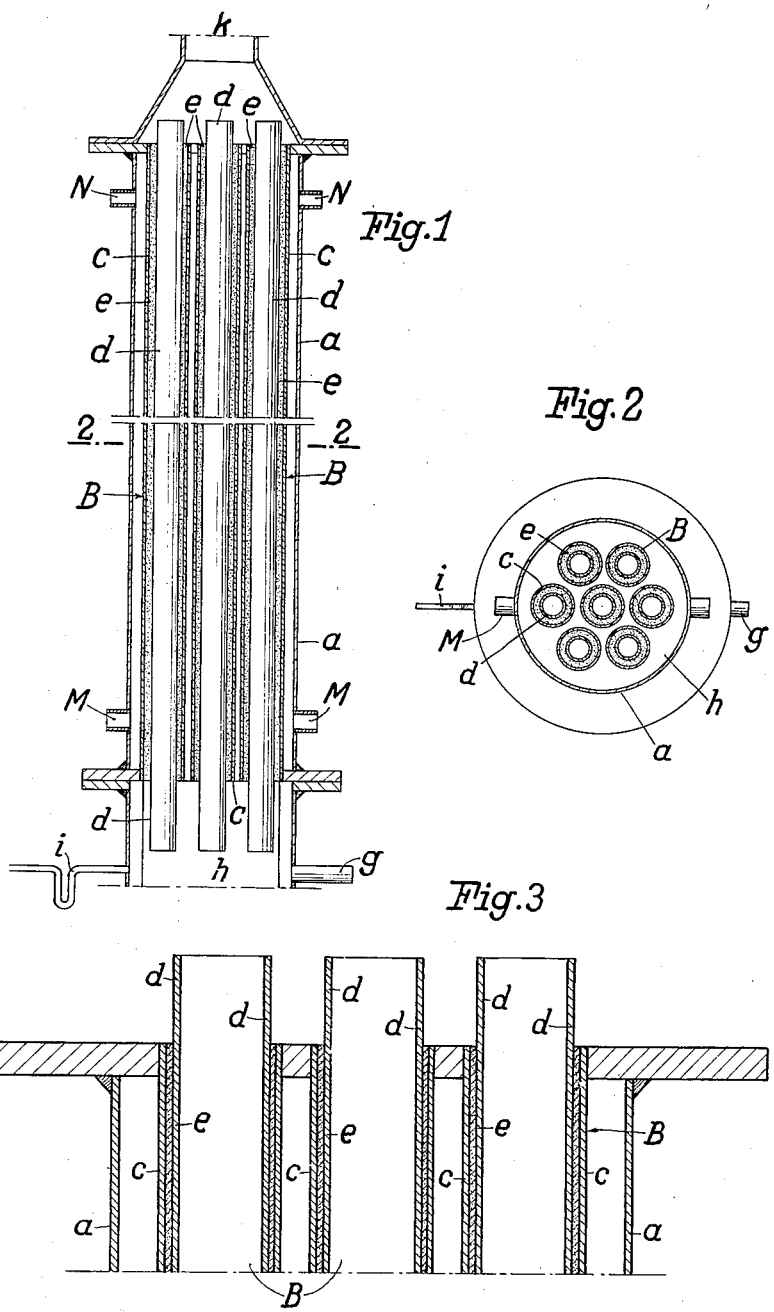
Inventors:
Conway Baron Von Girsewald
Wolfhart Siecke
Max Wohlwill Patented Feb. 23, 1937

2,071,598

UNITED STATES PATENT OFFICE 2,071,598

METHOD OF PRODUCING FUMING SULPHURIC ACID HAVING A HIGH CONCENTRATION

Conway Baron von Girsewald, Wolfhart Siecke, and Max Wohlwill, Frankfort-on-the-Main, Germany, assignors to American Lurgi Corporation, New York, N. Y., a corporation of New York Application December 24, 1935, Serial No. 55,960
In Germany January 11, 1935

15 Claims. (Cl. 23—170)

The present invention relates to a method of producing fuming sulphuric acid, and, more particularly, to a method of producing fuming sulphuric acid having a high $SO_3$ concentration.

Heretofore, fuming sulphuric acid has been generally produced by absorbing $SO_3$, obtained from a contact apparatus in concentrated sulphuric acid. In the conventional processes, usually pre-dried and cleaned $SO_2$ and gases containing oxygen were oxidized to $SO_3$, by means of suitable contact masses or catalysts. The hot gases leaving the contact masses have been cooled and washed with a great excess of cold sulphuric acid containing about 97% $H_2SO_4$. The excess of sulphuric acid has been necessary because the absorption of $SO_3$ would release considerable amounts of heat which raised the temperature of the reacting substances. On the other hand, such rise in temperature was extremely detrimental to the process of concentrating fuming sulphuric acid because, according to Knietsch at a temperature of 45° C. the pressure values of $SO_3$ amount to 43.6 mm. of mercury in a fuming sulphuric acid of 35%. Thus, the art of producing fuming sulphuric acid on an industrial scale was confronted with a grave problem because too great an excess of cold sulphuric acid would cause undue dilution of the formed fuming sulphuric acid and, on the other hand, if too little cold sulphuric acid has been added the temperature would rise and would decrease the concentration in view of the fact that the solubility of $SO_3$ in sulphuric acid is reduced when the temperature of the acid is increased. For this reason, the fuming sulphuric acid heretofore produced industrially did not have a concentration higher than about 27% $SO_3$.

It has been proposed to reduce the quantity of the circulating acid and to provide external cooling for maintaining the temperature of the acid within preferred limits. In a process of this character a tubular cooler sprayed with water is employed for producing fuming sulphuric acid of high concentration. Concentrations of only about 20% have been obtained at best, probably due to the fact that the temperatures at the lower end of the condenser tube were too high.

It has been also proposed to produce fuming sulphuric acid by means of direct condensation of $SO_3+H_2O$. Of course, in this case the amount of heat produced was even higher due to the fact that the absorption heat of $SO_3$ and the hydration and condensation heat of the simultaneously formed $H_2SO_4$ were added. Cooling of the reaction chambers of this type of condensation has caused great difficulties because any chilling of the gases containing $SO_3$ and $H_2O$ had to be carefully avoided in order to prevent the formation of practically non-condensable acid mists. According to a recent process disclosed in our copending applications Serial No. 711,198 and Serial No. 714,562, the latter now being U. S. Patent No. 2,017,676, the formation of mists can be prevented in the condensation of sulphuric acid by adequately regulating the cooling speed and by providing a suitable heat exchange apparatus for carrying out such cooling and condensation process. In our earlier process, however, the condensation has been carried out under such conditions that steam was present in at least sufficient quantity for the formation of $H_2SO_4$.

It is an object of the present invention to provide an improved process of producing fuming sulphuric acid which makes it possible to obtain fuming sulphuric acid of a very high concentration.

It is another object of the present invention to provide a process of producing fuming sulphuric acid having a concentration of up to 35% $SO_3$, which process is simple and economical and which can be readily carried out on an industrial scale.

It is a further object of the invention to provide an improved process for producing fuming sulphuric acid, which yields a fuming sulphuric acid having an $SO_3$ concentration unobtainable heretofore and which may be carried out in conventional and existing installations without requiring any substantial changes.

The invention also contemplates a process of producing fuming sulphuric acid by condensing $H_2SO_4$ from gases containing steam but in insufficient quantity for converting the total $SO_3$ present to sulphuric acid.

Other and further objects and advantages of the invention will become apparent from the following description taken in conjunction with the accompanying drawing, in which Fig. 1 illustrates a longitudinal sectional view of an apparatus for carrying the process of the invention into practice;

Fig. 2 is a cross section through the apparatus taken on line 2—2 of Fig. 1; and Fig. 3 shows an enlarged longitudinal sectional view of a portion of the apparatus depicted in Fig. 1.

Broadly stated, a process for the production of fuming sulphuric acid is provided according to the principles of the present invention by condensing $H_2SO_4$ from gases which do not contain sufficient quantity of steam for converting the total quantity of the SO₃ present to sulphuric acid. The present process comprises introducing hot gases containing H₂O and SO₃ into a condensation apparatus, for example, of the type described in our U. S. Patent No. 2,017,676 and of which a short description will be given hereinafter. In contrast, however, to conventional processes, the gases are not introduced at the bottom or lower portion of the apparatus, but at the top or upper portion thereof so that the gases and the formed sulphuric acid will pass co-currently through the apparatus from the top to the bottom. The reaction proceeds in the following manner:—

In the upper portion of the apparatus, the quantity of sulphuric acid corresponding to the quantity of H₂O present is first condensed by external and indirect cooling. The condensed acid trickles downwards in the condensing tubes containing a filling material and during its downward flow and further cooling absorbs a considerable portion of the excess SO₃ and forms fuming sulphuric acid of high concentration. It is one of the essential concepts of the invention to have both the gases and the formed sulphuric acid condensate flowing co-currently from the top of the apparatus to the bottom thereof so that the fuming sulphuric acid is withdrawn at relatively low temperatures whereby dilution of the fuming sulphuric acid caused by the relatively high vapor pressure of SO₃ at higher temperatures is prevented. On the other hand, the cooling agent is conducted countercurrently to the gases and to the acid formed in the apparatus whereby relatively high temperatures of the cooling agent are maintained in the upper portion of the apparatus where carefully controlled cooling is essential, and stronger and intense external cooling is provided in the lower portion of the apparatus where it is important to maintain low final temperatures within the condensing tubes. Thus, in contrast to the conventional processes, which had to withdraw the fuming sulphuric acid at relatively high temperatures, the fuming sulphuric acid is, according to the principles of the present invention, withdrawn at the lower end of the apparatus at relatively low temperatures whereby considerably higher concentrations are obtainable than by the prior processes employing large quantities of concentrated sulphuric acid for the purpose of absorption and cooling. A further important advantage of the process of the invention is that the acid flows downward by gravity and the necessity of pumping the absorption acid is eliminated.

The process embodying the present invention may be carried out in different suitable types of apparatus. We prefer, however, to employ the type of apparatus which is disclosed in our U. S. Patent No. 2,017,676 and which is described in the following short description taken in conjunction with the accompanying drawing.

The apparatus consists of an outer casing or shell $a$, preferably of sheet iron, having inlets and outlets $m$ and $n$. A plurality of tubes B is disposed in said shell, each of said tubes being formed by two concentric tubes of different materials, $c$ and $d$, preferably spaced apart with the intermediate space filled with a filling material $e$. The outer tube $c$, which contacts the cooling liquid, is made of a material of high mechanical strength, for example, metal, such as stainless steel or the like, while the inner tube $d$ is made of a ceramic material such as quartz, which need not have great mechanical strength but is capable of resisting sulphuric acid at high temperatures. The application of ceramic material has the further advantage that it is a poor conductor of heat whereby quick chilling of the reaction gases is prevented. The space in between the two tubes is filled with a suitable powdered material as powdered metals or fine sea sand which adds to the stability of the structure and permits slight relative displacement of the two tubes under the influence of heat. The reaction gases are introduced at the top $k$ of the apparatus and the condensed fuming sulphuric acid of high concentration is discharged at the bottom of the apparatus through a siphon seal $i$. The cooling medium, water or oil is introduced at the bottom of the apparatus through inlets M and is discharged at the top of the apparatus through outlet N. Thus, the incoming gases and vapors are subjected to carefully controlled and moderate cooling at the top of the apparatus, where the cooling medium is much warmer, while at the bottom of the apparatus the condensed fuming sulphuric acid is cooled with fresh and low temperature cooling agent so that it is capable of absorbing great amounts of SO₃.

It is to be observed that although the conducting of gases cocurrently through the condensing apparatus has already been contemplated in other arts, it has never been employed in the preparation of fuming sulphuric acid of high concentration and in such manner that in the upper portion of the apparatus the condensation of the sulphuric acid and in the lower portion thereof the absorption of the excess quantity of SO₃ is carried out to produce fuming sulphuric acid of high concentration. For example, even though the cooling would be carefully controlled, the condensation of fuming sulphuric acid carried out countercurrently would produce at best concentrations of 20% SO₃ in the fuming acid such as is produced by the conventional processes.

In addition to the advantages described hereinabove, the present invention appears to be in two directions. First, a fuming sulphuric acid of considerably higher concentration may be obtained than was possible heretofore. In the prior art a concentration of 27% SO₃ has usually been considered as the upper practical limit while according to the present process, concentrations of 35% are readily obtained. It would be possible to obtain even higher concentrations but for the presence of a maximum in the melting point curve H₂SO₄—SO₃, which is about 36° C. for 45% SO₃. In view of the fact, however, that this temperature should not be exceeded in order to keep the vapor pressure of SO₃ at a low value, there is a certain danger that at such extreme concentrations the apparatus may be clogged up with fuming sulphuric acid crystals which are frozen out. On the other hand, even obtaining a fuming sulphuric acid having a concentration as high as 35% represents great technical progress over the uppermost possibilities of prior processes.

The other important advantage of the present process consists in the possibility of conducting gases containing only small amounts of steam over the contact apparatus. According to the principles of the invention, it is unimportant whether this steam is passed over the catalyst or is added after the flow has passed through the contact apparatus. It is possible, for example, to conduct combustion gases containing SO₂ produced with air which has not been previously dehumidified but contains its natural moisture, directly into the contact apparatus without the necessity of previously drying the air by means of highly concentrated sulphuric acid. Thus, the cost of producing fuming sulphuric acid is considerably reduced by the possibility of omitting this step which was necessary in all prior processes.

Very naturally, when producing fuming sulphuric acid of the described high concentration, small quantities of $SO_3$ will be retained in the gases leaving the apparatus. For this reason, it is advisable to connect a small apparatus to the condensation apparatus, for washing the gases with concentrated sulphuric acid. Of course, the quantity of $SO_3$ in question is only a small fraction of the total quantity of $SO_3$ which is present and its absorption is greatly facilitated by the circumstance that due to the efficient cooling provided in the apparatus, the gases arrive to the washer at a relatively low temperature.

For the purpose of giving those skilled in the art a better understanding of the present invention, the following illustrative example is given:—

In a plant having a daily gas capacity of about 60,000 cubic meters, the gas is to be treated in accordance with the principles of the invention, the volume of the gas being figured at 0° C. and 760 mm. of mercury. The gas contains 7% $SO_3$ and in addition about 3.3% $H_2O$. The gas has a temperature of about 350° C. when it is introduced at the top of the water-cooled tubular cooler of the character described and has a temperature of 26° C. when it leaves the apparatus. The cooling water is introduced at the bottom of the apparatus and has the temperature of the water mains or of the water supply and during the time it rises to the top of the apparatus, the water is heated up to boiling temperature. Thus, in the upper portion of the apparatus, sulphuric acid is condensed corresponding to the quantity of $H_2O$ which is present. During its downward flow, this acid takes up so much $SO_3$ that at the lower end of the apparatus daily about 13.5 metric tons of fuming sulphuric acid having 34% free $SO_3$ may be withdrawn. The waste gases of the cooler contain about 3.4 tons of $SO_3$ corresponding to the vapor pressure of 34% fuming sulphuric acid at 26° C. This residual quantity of $SO_3$ is washed out with sulphuric acid of 95% in an adjoining washing tower. In the washing process, sulphuric acid of 97% is obtained which is either sold as such, or after being diluted to a concentration of 95% may be returned to the washing tower.

It is to be observed that the present invention provides a process of producing fuming sulphuric acid having a high concentration (for example 35%) by co-currently passing a downward flowing stream of $H_2O$ vapor and a large excess of $SO_3$ vapor in a vertical condensation chamber and by establishing an upward flow of a cooling liquid (for example, water, oil, etc.) around the external surface of said chamber. In order to prevent the formation of difficultly condensable mists, the velocity of flow of the vapors is so adjusted as to be between about 0.8 to about 5.0 metres per second. It is essential that the time required for cooling the vapors from the dew point thereof to 140° C. should be not less than about 0.2 to about 0.6 second. Temperatures gradually decreasing from about 140° C. to about 26° C. are maintained in the lower portion of the condensation chamber to facilitate absorption of relatively large quantities of $SO_3$ by means of the condensed liquid $H_2SO_4$. If these conditions are maintained the danger of mist formation is positively eliminated and fuming sulphuric acid having a high concentration up to 35% may be produced in a simple and economical manner.

We claim:

1. The method of producing fuming sulphuric acid which comprises establishing a decreasing temperature gradient from the top to the bottom of a condensation chamber, introducing $H_2O$ and $SO_3$ vapors at the upper portion of said chamber, said $SO_3$ being present in substantial excess over the quantity necessary to form $H_2SO_4$ with the $H_2O$ present, condensing $H_2SO_4$ in the uppermost portion of said chamber corresponding to the quantity of $H_2O$ present, conducting the remaining $SO_3$ vapors downward co-currently with the thus-formed $H_2SO_4$, absorbing substantial quantities of the excess $SO_3$ by means of said condensed $H_2SO_4$ trickling downwards, and withdrawing fuming sulphuric acid at the bottom of said chamber.

2. The method of producing fuming sulphuric acid which comprises establishing gradually decreasing cooling temperatures in an elongated condensation chamber, introducing $H_2O$ and $SO_3$ vapors into the upper portion of said chamber, said $SO_3$ being present in substantial excess over the quantity necessary to form $H_2SO_4$ with the $H_2O$ present, condensing $H_2SO_4$ at relatively high condensing temperatures in the uppermost portion of said chamber corresponding to the quantity of $H_2O$ present, conducting the remaining $SO_3$ vapors downward co-currently with the thus-formed $H_2SO_4$, subjecting the downward flowing condensed $H_2SO_4$ and the $SO_3$ vapors to progressively colder temperatures, absorbing substantial quantities of the excess $SO_3$ by means of said condensed $H_2SO_4$ trickling downwards at relatively low cooling temperatures to form fuming sulphuric acid, and withdrawing relatively cold fuming sulphuric acid containing a high concentration of $SO_3$ at the bottom portion of said chamber.

3. The method of producing fuming sulphuric acid which comprises introducing $H_2O$ and $SO_3$ vapors into the top portion of a vertical condensation chamber, said $SO_3$ being present in substantial excess over the quantity necessary to form $H_2SO_4$ with the $H_2O$ present, establishing an external upward flow of a cooling medium around the outer surface of said chamber in controlled heat exchange therewith, condensing $H_2SO_4$ to droplets corresponding to the quantity of $H_2O$ present at a mist-preventing cooling rate in the upper portion of said chamber, permitting said droplets of condensed acid to descend by gravity in said chamber co-currently and in intimate contact with the residual $SO_3$ vapors to form a film, subjecting said film of condensed $H_2SO_4$ to progressively colder temperatures, absorbing relatively large amounts of $SO_3$ by means of said film at gradually decreasing cooling temperatures, and withdrawing highly concentrated fuming sulphuric acid at the bottom portion of said chamber at a region where the temperature is approximately the coldest in the system.

4. The method of producing fuming sulphuric acid which comprises externally cooling a tubular vertical condensation chamber with an upward flow of a liquid cooling agent in heat exchange with said chamber and the contents thereof to establish a mist-preventing cooling rate and condensation temperatures in the upper portion thereof and gradually decreasing $SO_3$-absorbing temperatures in the lower portions thereof, introducing $H_2O$ and $SO_3$ vapors at the top of said chamber, said $SO_3$ being present in substantial excess over the quantity necessary to form $H_2SO_4$ with the $H_2O$ present, condensing $H_2SO_4$ in the top portion of said chamber from the $H_2O$ and from a portion of the $SO_3$ present, permitting said $H_2SO_4$ to descend by gravity co-currently and in intimate contact with the residual $SO_3$ vapors, cooling said condensed $H_2SO_4$ as it flows downward, absorbing relatively substantial quantities of $SO_3$ by means of said condensed $H_2SO_4$ during its downward flow at gradually decreasing cooling temperatures, and withdrawing highly concentrated fuming sulphuric acid at the bottom portion of said chamber at a region where the temperature is approximately the coldest.

5. The method of producing fuming sulphuric acid which comprises establishing a downward flow of $SO_3$ and $H_2O$ vapors in a vertical tubular condensation chamber, said $SO_3$ being present in substantial excess over the quantity necessary to form $H_2SO_4$ with the $H_2O$ present, establishing an upward flow of cooling liquid around the external surface of said chamber, in heat exchange with said chamber to maintain a mist-preventing rate of cooling and relatively high condensation temperatures at the upper portion of said chamber and gradually decreasing $SO_3$-absorbing temperatures in the lower portions of said chamber, condensing $H_2SO_4$ corresponding approximately to the quantity of the $H_2O$ present in the upper portion of said chamber, absorbing substantial quantities of $SO_3$ by means of said condensed $H_2SO_4$ during its downward flow while being subjected to decreasing temperatures, and withdrawing fuming sulphuric acid of high concentration at the bottom of said chamber in a region where the temperature is approximately the lowest.

6. The method of producing fuming sulphuric acid which comprises introducing $H_2O$ and $SO_3$ vapors at a temperature of about 350° C. at the top of a tubular vertical condensation chamber, said $SO_3$ being present in substantial excess over the quantity necessary to form $H_2SO_4$ with the $H_2O$ present, establishing an external upward flow of a cooling liquid of the group consisting of cooling water, oil and the like, around the outer surface of said chamber in controlled heat exchange with the contents thereof, condensing $H_2SO_4$ to droplets corresponding to the quantity of $H_2O$ present at mist-preventing cooling rate in the upper portion of said chamber, permitting said droplets of $H_2SO_4$ to descend by gravity in said chamber co-currently and in intimate contact with the residual $SO_3$ vapors to form a liquid film, absorbing relatively large amounts of $SO_3$ vapors by means of said liquid film at gradually decreasing cooling temperatures, and withdrawing highly concentrated fuming sulphuric acid at the bottom portion of said chamber at a temperature of about 26° C.

7. The method of producing fuming sulphuric acid which comprises establishing a downward flow of $SO_3$ and $H_2O$ vapors in a vertical condensation chamber, said $SO_3$ being present in substantial excess over the quantity necessary to form $H_2SO_4$ with the $H_2O$ present, establishing an upward flow of cooling liquid around the external surface of said chamber, in greatly retarded heat exchange with the contents of said chamber to maintain a mist-preventing rate of cooling and relatively high condensing temperatures at the upper portion of said chamber and gradually decreasing temperatures promoting absorption of the $SO_3$ in the lower portions of said chamber, condensing liquid $H_2SO_4$ corresponding to the quantity of the $H_2O$ present in the upper portions of said chamber, absorbing substantial quantities of $SO_3$ vapor by means of said condensed liquid $H_2SO_4$ during its downward flow while being subjected to decreasing temperatures, and withdrawing fuming sulphuric acid of high concentration at the bottom portion of said chamber where the temperature is the lowest.

8. The method of producing fuming sulphuric acid which comprises introducing $H_2O$ and $SO_3$ gases at the top of a plurality of vertical condensation tubes of low heat conductivity, said $SO_3$ being present in substantial excess over the quantity necessary for the formation of $H_2SO_4$ with the $H_2O$ present, externally cooling said condensation tubes with a liquid cooling agent flowing in an upward direction, condensing $H_2SO_4$ corresponding to the quantity of the $H_2O$ present in the upper portion of said tubes at mist preventing temperatures, absorbing substantial quantities of $SO_3$ by means of said $H_2SO_4$ during its downward flow, and withdrawing fuming sulphuric acid of high concentration at the bottom portion of said tubes at a region where the temperature is approximately the lowest.

9. The method of producing fuming sulphuric acid which comprises establishing gradually decreasing cooling temperatures in an elongated condensation chamber, introducing $H_2O$ and $SO_3$ vapors into the top portion of said chamber, said $SO_3$ being present in substantial excess over the quantity necessary to form $H_2SO_4$ with the $H_2O$ present, condensing $H_2SO_4$ at relatively high condensing temperatures in the uppermost portion of said chamber corresponding to the quantity of $H_2O$ present, conducting the remaining $SO_3$ vapors downward co-currently with the formed $H_2SO_4$, absorbing substantial quantities of the excess $SO_3$ by means of said condensed liquid $H_2SO_4$ trickling downwards at relatively low cooling temperatures to form fuming sulphuric acid, withdrawing fuming sulphuric acid of high concentration at the bottom of the apparatus, separately withdrawing residual $SO_3$ vapors for introducing into a washing apparatus, absorbing said vapors by means of $H_2SO_4$ of about 95% whereby $H_2SO_4$ of 97% is obtained, diluting part of said acid to a concentration of 95% and returning said diluted acid to the said washing apparatus.

10. The method of producing fuming sulphuric acid which comprises establishing a downward flow of $SO_3$ and $H_2O$ vapors in a vertical condensation chamber, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a mist preventing cooling rate between the dew point of said vapors and about 140° C. in the upper portion of said chamber and temperatures gradually decreasing to about 26° C. in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the lower portion of said chamber, and withdrawing fuming sulphuric acid having a concentration of about 35% at the bottom portion of said chamber.

11. The method of producing fuming sulphuric acid which comprises introducing $SO_3$ and $H_2O$ vapors at a temperature of about 350° C. into a vertical condensation chamber at the top thereof, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a cooling time of about 0.2 to 0.6 second between the dew point of said vapors and about 140° C. in the upper portion of said chamber and temperatures gradually decreasing to about 26° C. in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the lower portion of said chamber, said withdrawn fuming sulphuric acid having a concentration of about 35% at the bottom portion of said chamber.

12. The method of producing fuming sulphuric acid which comprises establishing a downward flow of $SO_3$ and $H_2O$ vapors in a vertical condensation chamber at velocities of flow from about 0.8 to about 5.0 metres per second, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a cooling time not less than about 0.2 second between the dew point of said vapors and about 140° C. in the upper portion of said chamber and temperatures gradually decreasing to about 26° C. in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the lower portion of said chamber, and withdrawing fuming sulphuric acid having a concentration of about 35% at the bottom portion of said chamber.

13. The method of producing fuming sulphuric acid which comprises establishing a downward flow of $SO_3$ and $H_2O$ vapors in a vertical condensation chamber, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a mist preventing cooling rate between the dew point of said vapors and about 140° C. in the upper portion of said chamber and temperatures gradually decreasing to approach that of the cooling medium in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the lower portion of said chamber, and withdrawing fuming sulphuric acid at the bottom portion of said chamber.

14. The method of producing fuming sulphuric acid which comprises introducing $SO_3$ and $H_2O$ vapors at a temperature of about 350° C. into a vertical condensation chamber at the top thereof, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a cooling time of about 0.2 to about 0.6 second between the dew point of said vapors and about 140° C. in the upper portion of said chamber and temperatures gradually decreasing to that at which the effluent gases are substantially devoid of $SO_3$ in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the upper portion of said chamber, and withdrawing fuming sulphuric acid at the lower portion of said chamber.

15. The method of producing fuming sulphuric acid which comprises establishing a downward flow of $SO_3$ and $H_2O$ vapors in a vertical condensation chamber at velocities of flow from about 0.8 to about 5.0 metres per second, said $SO_3$ being present in substantial excess over the quantity necessary to form $H_2SO_4$ with the $H_2O$ present, establishing an external upward flow of a cooling liquid around the outer surface of said chamber in controlled heat exchange with the contents thereof to provide a cooling time not less than about 0.2 second between the dew point of said vapors and about 140° C. in the upper portion of said chamber and temperatures gradually decreasing to that of about the cooling medium in the lower portion of said chamber, condensing $H_2SO_4$ corresponding to the quantity of $H_2O$ present in the upper portion of said chamber, absorbing relatively large amounts of $SO_3$ vapors by means of the condensed $H_2SO_4$ trickling downwards in the lower portion of said chamber, and withdrawing fuming sulphuric acid at the bottom of said chamber.

CONWAY BARON von GIRSEWALD.
WOLFHART SIECKE.
MAX WOHLWILL.